(12) United States Patent
Haq et al.

(10) Patent No.: US 6,275,812 B1
(45) Date of Patent: Aug. 14, 2001

(54) INTELLIGENT SYSTEM FOR DYNAMIC RESOURCE MANAGEMENT

(75) Inventors: Tanveer UI Haq, Pine Brook, NJ (US); Bradley S. Barnhorst, Orange Park, FL (US); Salvatore A. Betro, Whippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/207,451

(22) Filed: Dec. 8, 1998

(51) Int. Cl.[7] .................................................. G06F 17/30
(52) U.S. Cl. .................................... 705/11; 705/7; 705/8; 705/9
(58) Field of Search ................................ 705/7, 8, 9, 11

(56) References Cited

U.S. PATENT DOCUMENTS

| | | | |
|---|---|---|---|
| 4,650,426 | * 3/1987 | Brigance | 434/322 |
| 4,671,772 | * 6/1987 | Slade et al. | 434/219 |
| 4,700,297 | * 10/1987 | Hagel, Sr. et al. | 705/30 |
| 4,937,743 | * 6/1990 | Rassman et al. | 705/30 |
| 5,117,353 | * 5/1992 | Stipanovich et al. | 705/11 |
| 5,164,897 | * 11/1992 | Clark et al. | 705/1 |
| 5,197,004 | * 3/1993 | Sobotka et al. | 705/8 |
| 5,206,903 | * 4/1993 | Kohler et al. | 379/309 |
| 5,325,292 | * 6/1994 | Crockett | 705/9 |
| 5,416,694 | * 5/1995 | Parrish et al. | 705/8 |
| 5,963,911 | * 5/1995 | Walker et al. | 705/7 |
| 5,978,767 | * 11/1999 | Chriest et al. | 705/1 |
| 6,007,340 | * 12/1999 | Morrell-Samuels | 434/236 |

FOREIGN PATENT DOCUMENTS

| | | |
|---|---|---|
| 1185844 | * 3/1999 | (JP) . |
| WO0028438 | * 5/2000 | (WO) . |

OTHER PUBLICATIONS

Nero, A., "A study to identify the importance and knowledge/skill of tasks performed by market research analysts for consumer and industry goods manufacture", Ph.D. Dissertation, University of Minnesota, 1981.*

"Major Vendors Unveil New Products at HR Tech Conference", Business Wire. Dialog File 20, Access No. 07338076, Sep. 1999.*

SuccessFactors.com and TrainingNet Partner to Integrate Skills Assessments and Training, Business Wire, Dialog File 20, Access No. 07339367, Sep. 1999.*

"Implementing a System in the Global Village", Education & Training, v37n1, PP:27–32, 1995.*

El–Sherif et al., "Planning Vitality, Assessment and Enhancement: Part 1", Training & Management Development Methods, v8n4, pp:2.23–2.32, Sep. 1999.*

Montague, Kim, "Skills Assessment aids staff development, deployment", Control Engineering, vol. 46, issue 7, p23, 1p, Jul. 1999.*

Gary Meyer, "360 On the Net: a computer toolkit for mutirater performance feedback", HRMagazine, vol. v43 Issue n11, Oct. 1998.*

"http://www.successfactors.com/pr_activesw.html", News Release, Feb. 2000.*

Riley, Michael, "Tracing Skills Accumulated Through Experience: A Method of Skill Auditing", Education & Training, v36n8, pp:13–27, 1994.*

* cited by examiner

Primary Examiner—James P. Trammell
Assistant Examiner—Tongoc Tran
(74) Attorney, Agent, or Firm—Brown & Michaels, PC

(57) ABSTRACT

A system or method for human resource skill management, training, career development, and deployment, linking specialties, job functions, skill sets, and experience/training profiles. The method uses skill templates, an innovation that allows for systematic evaluation of employee skills. A weighting system is used to establish the relative significance of various skills. Skills are sub-classified as per technology. Assessment of employee suitability for a project is based on quantitative evaluation and not on a subjective consideration. Various new skills assessment metrics have been introduced.

14 Claims, 11 Drawing Sheets

Fig. 3

| Skills (20) | TDMA (21) | | | GSM (22) | | | CDMA (23) | | |
|---|---|---|---|---|---|---|---|---|---|
| | W | I | P | W | I | P | W (24) | I (25) | P (26) |
| Specialty Skills (S) | | | | | | | | | |
| 1. RF Design Skill 1 | 0 | 0 | 0 | 0 | 0 | 0 | 1 | 1 | |
| 2. RF Design Skill 2 | 0 | 0 | 0 | 0 | 0 | 0 | 2 | 1 | |
| 3. RF Design Skill 3 | 0 | 0 | 0 | 0 | 0 | 0 | 1 | 1 | |
| 4. RF Maint. Skill 1 | 0 | 0 | 0 | 0 | 0 | 0 | 2 | 1 | |
| 5. RF Maint. Skill 2 | 0 | 0 | 0 | 0 | 0 | 0 | 3 | 2 | |
| 6. RF Maint. Skill 3 | 0 | 0 | 0 | 0 | 0 | 0 | 2 | 1 | |
| 7. RF Optimization Skill 1 | 0 | 0 | 0 | 0 | 0 | 0 | 3 | 2 | |
| 8. RF Optimization Skill 2 | 0 | 0 | 0 | 0 | 0 | 0 | 3 | 2 | |
| 9. Network Performance Skill 1 | 0 | 0 | 0 | 0 | 0 | 0 | 3 | 2 | |
| 10. Network Performance Skill 2 | 0 | 0 | 0 | 0 | 0 | 0 | 3 | 2 | |
| General Skills (G) | | | | | | | | | |
| 1. Skill 1 | 0 | 0 | 0 | 0 | 0 | 0 | 2 | 1 | |
| 2. Skill 2 | 0 | 0 | 0 | 0 | 0 | 0 | 2 | 1 | |
| 3. Skill 3 | 0 | 0 | 0 | 0 | 0 | 0 | 2 | 2 | |
| 4. Skill 4 | 0 | 0 | 0 | 0 | 0 | 0 | 2 | 2 | |
| 5. Skill 5 | 0 | 0 | 0 | 0 | 0 | 0 | 2 | 2 | |
| 6. Skill 6 | 0 | 0 | 0 | 0 | 0 | 0 | 1 | 1 | |
| 7. Skill 7 | 0 | 0 | 0 | 0 | 0 | 0 | 0 | 0 | |
| 8. Skill 8 | 0 | 0 | 0 | 0 | 0 | 0 | 0 | 0 | |
| 9. Skill 9 | 0 | 0 | 0 | 0 | 0 | 0 | 1 | 1 | |
| Total | (30) | | | (31) | | | 35 (32) | | |
| SIA (Skills Index Average) | (36) | | | (37) | | | (38) | | |

Fig. 4

| Skills | TDMA | | | GSM | | | CDMA (23) | | |
|---|---|---|---|---|---|---|---|---|---|
| | W | I | P | W | I | P | W (24) | I (25) | P (26) |
| Specialty Skills (S) | | | | | | | | | |
| 1. RF Design Skill 1 | 0 | 0 | 0 | 0 | 0 | 0 | 1 | 1 | 1 |
| 2. RF Design Skill 2 | 0 | 0 | 0 | 0 | 0 | 0 | 2 | 1 | 2 |
| 3. RF Design Skill 3 | 0 | 0 | 0 | 0 | 0 | 0 | 1 | 1 | 1 |
| 4. RF Maint. Skill 1 | 0 | 0 | 0 | 0 | 0 | 0 | 2 | 1 | 2 |
| 5. RF Maint. Skill 2 | 0 | 0 | 0 | 0 | 0 | 0 | 3 | 2 | 6 |
| 6. RF Maint. Skill 3 | 0 | 0 | 0 | 0 | 0 | 0 | 2 | 1 | 2 |
| 7. RF Optimization Skill 1 | 0 | 0 | 0 | 0 | 0 | 0 | 3 | 2 | 6 |
| 8. RF Optimization Skill 2 | 0 | 0 | 0 | 0 | 0 | 0 | 3 | 2 | 6 |
| 9. Network Performance Skill 1 | 0 | 0 | 0 | 0 | 0 | 0 | 1 | 1 | 1 |
| 10. Network Performance Skill 2 | 0 | 0 | 0 | 0 | 0 | 0 | 2 | 1 | 2 |
| | | | | | | | | | |
| General Skills (G) | | | | | | | | | |
| 1. Skill 1 | 0 | 0 | 0 | 0 | 0 | 0 | 2 | 1 | 2 |
| 2. Skill 2 | 0 | 0 | 0 | 0 | 0 | 0 | 2 | 1 | 2 |
| 3. Skill 3 | 0 | 0 | 0 | 0 | 0 | 0 | 2 | 2 | 4 |
| 4. Skill 4 | 0 | 0 | 0 | 0 | 0 | 0 | 2 | 2 | 4 |
| 5. Skill 5 | 0 | 0 | 0 | 0 | 0 | 0 | 2 | 2 | 4 |
| 6. Skill 6 | 0 | 0 | 0 | 0 | 0 | 0 | 1 | 1 | 1 |
| 7. Skill 7 | 0 | 0 | 0 | 0 | 0 | 0 | 0 | 0 | 0 |
| 8. Skill 8 | 0 | 0 | 0 | 0 | 0 | 0 | 0 | 0 | 0 |
| 9. Skill 9 | 0 | 0 | 0 | 0 | 0 | 0 | 1 | 1 | 1 |
| | | | | | | | | | |
| Total | | | | | | | | 35 | 47 (35) |
| SIA (Skills Index Average) | | | | | | | | | |

Fig. 5

Engineer 1 Skills Assessment

| Skills | TDMA (21) | | | GSM (22) | | | CDMA (23) | | |
|---|---|---|---|---|---|---|---|---|---|
| | W | I | P | W | I | P | W (24) | I (25) | P (26) |
| Specialty Skills (S) | | | | | | | | | |
| 1. RF Design Skill 1 | 3 | 2 | 6 | 3 | 2 | 6 | 3 | 2 | 6 |
| 2. RF Design Skill 2 | 3 | 1 | 3 | 3 | 1 | 3 | 3 | 2 | 6 |
| 3. RF Design Skill 3 | 3 | 1 | 3 | 3 | 1 | 3 | 3 | 2 | 6 |
| 4. RF Maint. Skill 1 | 3 | 1 | 3 | 3 | 1 | 3 | 3 | 2 | 6 |
| 5. RF Maint. Skill 2 | 3 | 0 | 0 | 3 | 0 | 0 | 3 | 2 | 6 |
| 6. RF Maint. Skill 3 | 3 | 1 | 3 | 3 | 1 | 3 | 3 | 1 | 3 |
| 7. RF Optimization Skill 1 | 3 | 0 | 0 | 3 | 0 | 0 | 3 | 1 | 3 |
| 8. RF Optimization Skill 2 | 3 | 0 | 0 | 3 | 0 | 0 | 3 | 2 | 6 |
| 9. Network Performance Skill 1 | 3 | 0 | 0 | 3 | 0 | 0 | 3 | 1 | 3 |
| 10. Network Performance Skill 2 | 3 | 0 | 0 | 3 | 0 | 0 | 3 | 1 | 3 |
| | | | | | | | | | |
| General Skills (G) | | | | | | | | | |
| 1. Skill 1 | 1 | 1 | 2 | 2 | 1 | 2 | 2 | 1 | 2 |
| 2. Skill 2 | 2 | 1 | 6 | 2 | 1 | 6 | 2 | 1 | 2 |
| 3. Skill 3 | 3 | 2 | 4 | 3 | 2 | 4 | 3 | 2 | 6 |
| 4. Skill 4 | 2 | 2 | 4 | 2 | 2 | 4 | 2 | 2 | 4 |
| 5. Skill 5 | 2 | 2 | 2 | 2 | 2 | 2 | 2 | 2 | 4 |
| 6. Skill 6 | 2 | 1 | 0 | 2 | 1 | 0 | 2 | 1 | 2 |
| 7. Skill 7 | 1 | 0 | 0 | 1 | 0 | 0 | 1 | 0 | 0 |
| 8. Skill 8 | 1 | 0 | 2 | 1 | 0 | 2 | 1 | 0 | 0 |
| 9. Skill 9 | 2 | 1 | 0 | 2 | 1 | 0 | 2 | 1 | 2 |
| | | | | | | | | | |
| Total | 47 (30) | | 38 | 47 (31) | | 70 | 47 (32) | | 70 |
| SIA (Skills Index Average) | 0.85 (36) | | | 0.85 (37) | | | 1.49 (38) | | |

Fig. 6

Engineer 2 Skills Assessment

| Skills | TDMA | | | GSM | | | CDMA | | |
|---|---|---|---|---|---|---|---|---|---|
| | W | I | P | W | I | P | W | I | P |
| Specialty Skills (S) | | | | | | | | | |
| 1. RF Design Skill 1 | 3 | 0 | 0 | 3 | 0 | 0 | 3 | 0 | 0 |
| 2. RF Design Skill 2 | 3 | 0 | 0 | 3 | 0 | 0 | 3 | 1 | 3 |
| 3. RF Design Skill 3 | 3 | 1 | 3 | 3 | 1 | 3 | 3 | 1 | 3 |
| 4. RF Maint. Skill 1 | 3 | 1 | 3 | 3 | 1 | 3 | 3 | 1 | 3 |
| 5. RF Maint. Skill 2 | 3 | 0 | 0 | 3 | 0 | 0 | 3 | 2 | 6 |
| 6. RF Maint. Skill 3 | 3 | 1 | 3 | 3 | 1 | 3 | 3 | 1 | 3 |
| 7. RF Optimization Skill 1 | 3 | 0 | 0 | 3 | 0 | 0 | 3 | 2 | 6 |
| 8. RF Optimization Skill 2 | 3 | 0 | 0 | 3 | 0 | 0 | 3 | 2 | 6 |
| 9. Network Performance Skill 1 | 3 | 0 | 0 | 3 | 0 | 0 | 3 | 1 | 3 |
| 10. Network Performance Skill 2 | 3 | 0 | 0 | 3 | 0 | 0 | 3 | 2 | 6 |
| General Skills (G) | | | | | | | | | |
| 1. Skill 1 | 2 | 1 | 2 | 2 | 1 | 2 | 2 | 1 | 2 |
| 2. Skill 2 | 2 | 1 | 2 | 2 | 1 | 2 | 2 | 1 | 2 |
| 3. Skill 3 | 3 | 2 | 6 | 3 | 2 | 6 | 3 | 2 | 6 |
| 4. Skill 4 | 2 | 2 | 4 | 2 | 2 | 4 | 2 | 2 | 4 |
| 5. Skill 5 | 2 | 2 | 4 | 2 | 2 | 4 | 2 | 2 | 4 |
| 6. Skill 6 | 2 | 1 | 2 | 2 | 1 | 2 | 2 | 1 | 2 |
| 7. Skill 7 | 1 | 0 | 0 | 1 | 0 | 0 | 1 | 0 | 0 |
| 8. Skill 8 | 1 | 0 | 0 | 1 | 0 | 0 | 1 | 0 | 0 |
| 9. Skill 9 | 2 | 1 | 2 | 2 | 1 | 2 | 2 | 1 | 2 |
| | | | | | | | | | |
| Total | 47 | | 31 | 47 | | 61 | 47 | | 61 |
| SIA (Skills Index Average) | 1.3 | | | 0.66 | | | 1.3 | | |

Fig. 7

Engineer 3 Skills Assessment

| Skills | TDMA | | | GSM | | | CDMA | | |
|---|---|---|---|---|---|---|---|---|---|
|  | W | I | P | W | I | P | W | I | P |
| Specialty Skills (S) | | | | | | | | | |
| 1. RF Design Skill 1 | 3 | 0 | 0 | 3 | 0 | 0 | 3 | 0 | 0 |
| 2. RF Design Skill 2 | 3 | 0 | 0 | 3 | 0 | 0 | 3 | 0 | 0 |
| 3. RF Design Skill 3 | 3 | 0 | 0 | 3 | 0 | 0 | 3 | 1 | 3 |
| 4. RF Maint. Skill 1 | 3 | 1 | 3 | 3 | 1 | 3 | 3 | 1 | 3 |
| 5. RF Maint. Skill 2 | 3 | 0 | 0 | 3 | 0 | 0 | 3 | 1 | 3 |
| 6. RF Maint. Skill 3 | 3 | 1 | 3 | 3 | 1 | 3 | 3 | 1 | 3 |
| 7. RF Optimization Skill 1 | 3 | 0 | 0 | 3 | 0 | 0 | 3 | 2 | 6 |
| 8. RF Optimization Skill 2 | 3 | 0 | 0 | 3 | 0 | 0 | 3 | 2 | 6 |
| 9. Network Performance Skill 1 | 3 | 0 | 0 | 3 | 0 | 0 | 3 | 1 | 3 |
| 10. Network Performance Skill 2 | 3 | 0 | 0 | 3 | 0 | 0 | 3 | 1 | 3 |
| | | | | | | | | | |
| General Skills (G) | | | | | | | | | |
| 1. Skill 1 | 2 | 2 | 4 | 2 | 2 | 4 | 2 | 3 | 6 |
| 2. Skill 2 | 2 | 2 | 4 | 2 | 2 | 4 | 2 | 3 | 6 |
| 3. Skill 3 | 3 | 1 | 3 | 3 | 1 | 3 | 3 | 2 | 6 |
| 4. Skill 4 | 2 | 2 | 4 | 2 | 2 | 4 | 2 | 3 | 6 |
| 5. Skill 5 | 2 | 2 | 4 | 2 | 2 | 4 | 2 | 3 | 6 |
| 6. Skill 6 | 2 | 1 | 2 | 2 | 1 | 2 | 2 | 3 | 6 |
| 7. Skill 7 | 1 | 0 | 0 | 1 | 0 | 0 | 1 | 0 | 0 |
| 8. Skill 8 | 1 | 0 | 0 | 1 | 0 | 0 | 1 | 0 | 0 |
| 9. Skill 9 | 2 | 1 | 2 | 2 | 1 | 2 | 2 | 3 | 6 |
| | | | | | | | | | |
| Total | 47 | | 29 | 47 | | 29 | 47 | | 72 |
| SIA (Skills Index Average) | 0.62 (36) | | | 0.62 (37) | | | 1.53 (38) | | |

Fig. 8

Engineer 1 Suitability Assessment Form

| Skills | CDMA SSIA | | | CDMA RSIA | | |
|---|---|---|---|---|---|---|
| | W | I | P | W | I | P |
| Specialty Skills (S) | | | | | | |
| 1. RF Design Skill 1 | 1 | 1 | 1 | 1 | 2 | 2 |
| 2. RF Design Skill 2 | 2 | 1 | 2 | 2 | 2 | 4 |
| 3. RF Design Skill 3 | 1 | 1 | 1 | 1 | 2 | 2 |
| 4. RF Maint. Skill 1 | 2 | 1 | 2 | 2 | 2 | 4 |
| 5. RF Maint. Skill 2 | 3 | 2 | 6 | 3 | 2 | 6 |
| 6. RF Maint. Skill 3 | 2 | 1 | 2 | 2 | 1 | 2 |
| 7. RF Optimization Skill 1 | 3 | 1 | 3 | 3 | 1 | 3 |
| 8. RF Optimization Skill 2 | 3 | 2 | 6 | 3 | 2 | 6 |
| 9. Network Performance Skill 1 | 1 | 1 | 1 | 1 | 1 | 1 |
| 10. Network Performance Skill 2 | 2 | 1 | 2 | 2 | 1 | 2 |
| | | | | | | |
| General Skills (G) | | | | | | |
| 1. Skill 1 | 2 | 1 | 2 | 2 | 1 | 2 |
| 2. Skill 2 | 2 | 1 | 2 | 2 | 1 | 2 |
| 3. Skill 3 | 2 | 2 | 4 | 2 | 2 | 4 |
| 4. Skill 4 | 2 | 2 | 4 | 2 | 2 | 4 |
| 5. Skill 5 | 2 | 2 | 4 | 2 | 2 | 4 |
| 6. Skill 6 | 1 | 1 | 1 | 1 | 1 | 1 |
| 7. Skill 7 | 0 | 0 | 0 | 0 | 0 | 0 |
| 8. Skill 8 | 0 | 0 | 0 | 0 | 0 | 0 |
| 9. Skill 9 | 1 | 1 | 1 | 1 | 1 | 1 |
| | | | | | | |
| Total | | | 44 | | | 50 |
| SSIA/RSIA | | | 3.74 | | | 4.26 |

Fig. 9

Engineer 2 Suitability Assessment

| Skills | CDMA SSIA | | | CDMA RSIA | | |
|---|---|---|---|---|---|---|
| | W | I | P | W | I | P |
| Specialty Skills (S) | | | | | | |
| 1. RF Design Skill 1 | 1 | 0 | 0 | 1 | 0 | 0 |
| 2. RF Design Skill 2 | 2 | 1 | 2 | 2 | 1 | 2 |
| 3. RF Design Skill 3 | 1 | 1 | 1 | 1 | 1 | 1 |
| 4. RF Maint. Skill 1 | 2 | 1 | 2 | 2 | 1 | 2 |
| 5. RF Maint. Skill 2 | 3 | 2 | 6 | 3 | 2 | 6 |
| 6. RF Maint. Skill 3 | 2 | 1 | 2 | 2 | 1 | 2 |
| 7. RF Optimization Skill 1 | 3 | 2 | 6 | 3 | 2 | 6 |
| 8. RF Optimization Skill 2 | 3 | 2 | 6 | 3 | 2 | 6 |
| 9. Network Performance Skill 1 | 1 | 1 | 1 | 1 | 1 | 1 |
| 10. Network Performance Skill 2 | 2 | 1 | 2 | 2 | 2 | 4 |
| General Skills (G) | | | | | | |
| 1. Skill 1 | 2 | 1 | 2 | 2 | 1 | 2 |
| 2. Skill 2 | 2 | 1 | 2 | 2 | 1 | 2 |
| 3. Skill 3 | 2 | 2 | 4 | 2 | 2 | 4 |
| 4. Skill 4 | 2 | 2 | 4 | 2 | 2 | 4 |
| 5. Skill 5 | 2 | 2 | 4 | 2 | 2 | 4 |
| 6. Skill 6 | 1 | 1 | 1 | 1 | 1 | 1 |
| 7. Skill 7 | 0 | 0 | 0 | 0 | 0 | 0 |
| 8. Skill 8 | 0 | 0 | 0 | 0 | 0 | 0 |
| 9. Skill 9 | 1 | 1 | 1 | 1 | 1 | 1 |
| Total | | | 46 | | | 48 |
| SSIA/RSIA | | | 3.91 | | | 4.09 |

Fig. 10

Engineer 3 Suitability Assessment

| Skills | CDMA SSIA | | | CDMA RSIA | | |
|---|---|---|---|---|---|---|
| | W | I | P | W | I | P |
| Specialty Skills (S) | | | | | | |
| 1. RF Design Skill 1 | 1 | 0 | 0 | 1 | 0 | 0 |
| 2. RF Design Skill 2 | 2 | 0 | 0 | 2 | 0 | 0 |
| 3. RF Design Skill 3 | 1 | 1 | 1 | 1 | 1 | 1 |
| 4. RF Maint. Skill 1 | 2 | 1 | 2 | 2 | 1 | 2 |
| 5. RF Maint. Skill 2 | 3 | 1 | 3 | 3 | 1 | 3 |
| 6. RF Maint. Skill 3 | 2 | 1 | 2 | 2 | 1 | 2 |
| 7. RF Optimization Skill 1 | 3 | 2 | 6 | 3 | 2 | 6 |
| 8. RF Optimization Skill 2 | 3 | 2 | 6 | 3 | 2 | 6 |
| 9. Network Performance Skill 1 | 1 | 1 | 1 | 1 | 1 | 1 |
| 10. Network Performance Skill 2 | 2 | 1 | 2 | 2 | 1 | 2 |
| | | | | | | |
| General Skills (G) | | | | | | |
| 1. Skill 1 | 2 | 1 | 2 | 2 | 3 | 6 |
| 2. Skill 2 | 2 | 1 | 2 | 2 | 3 | 6 |
| 3. Skill 3 | 2 | 2 | 4 | 2 | 2 | 4 |
| 4. Skill 4 | 2 | 2 | 4 | 2 | 3 | 6 |
| 5. Skill 5 | 2 | 2 | 4 | 2 | 3 | 6 |
| 6. Skill 6 | 1 | 1 | 1 | 1 | 3 | 3 |
| 7. Skill 7 | 0 | 0 | 0 | 0 | 0 | 0 |
| 8. Skill 8 | 0 | 0 | 0 | 0 | 0 | 0 |
| 9. Skill 9 | 1 | 1 | 1 | 1 | 3 | 3 |
| | | | | | | |
| Total | | | 41 | | | 57 |
| SSIA/RSIA | | | 3.49 | | | 4.85 |

Fig. 11

| No | Employee Name | SSIA | RSIA | SIA CDMA | Employee Deployment Schedule/ Locations ||||
|---|---|---|---|---|---|---|---|---|
| | | | | | Jan | Feb | Mar | Apr |
| 1 | Engineer 2 | 3.91 | 4.09 | 1.3 | C T | I C | V | C |
| | | | | | PA | WH | PA WH | BG |
| 2 | Engineer 1 | 3.74 | 4.26 | 1.49 | | C | I | I |
| | | | | | IH | CH | IH | DT |
| 3 | Engineer 3 | 3.49 | 4.85 | 1.53 | I | C | T | C I |
| | | | | | WH | WA | WH | NY MH |

LEGEND

 Employee is unavailable

Task Codes:

C: Customer Assignments
I: In-house Rotational Assignment
T: Training
V: Vacation

Location Codes:

PA: Philadelphia
WH: Whippany
BG: Branchburg, NJ
IH: Indian Hill Court
CH: Chicago
DT: Detroit
WA: Washington, DC
NY: New York
MH: Murray Hill, NJ

Fig. 12

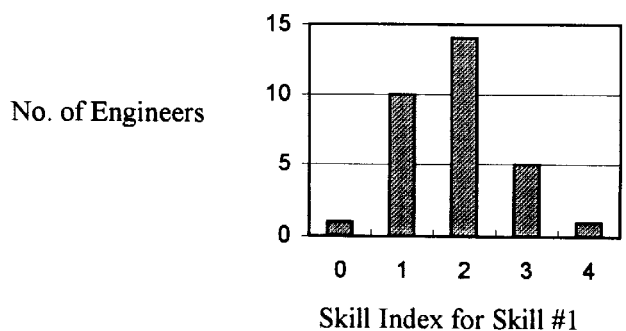

No. of Engineers

Skill Index for Skill #1

INTELLIGENT SYSTEM FOR DYNAMIC RESOURCE MANAGEMENT

FIELD OF THE INVENTION

The invention pertains to the field of methods of managing human resources. More particularly, the invention pertains to methods of optimizing the assignment of employees to positions based upon a multi-factored analysis and database.

BACKGROUND OF THE INVENTION

Every company aims at achieving functional excellence in a competitive market environment. Functional excellence includes exact specifications of roles and responsibilities for various job functions, employee skills management, training and career development, and maximization of capacity utilization. The problem at hand is to develop an integrated, easy to use system for improvement and maintenance of functional excellence in a company.

Maintaining a highly skilled work force and to increase its utilization for productivity are complex problems faced by competitive companies. The work force not only should be trained, it must possess the exact skills required for performing specific job functions for the success of business projects. This requires some advanced planning and management. Furthermore, when a project is at hand, it is imperative that personnel with the right skills are assigned to various tasks. Matching up employee skill set with the job functions is also a difficult problem, specially when the pool of employees is large, as is the case in big corporations. Career guidance for employees is another issue faced by supervisors and mentors. Every employee needs to know as to how he/she can plan his/her career to achieve a certain level of proficiency, skill set, and responsibility, etc. A well organized system is therefore required to achieve these goals.

SUMMARY OF THE INVENTION

The Intelligent System for Dynamic Resource Management (ISDRM) of the invention is an innovative new system that significantly improves upon the existing systems for human resource skill management, training, career development, and deployment. Some of the salient differences/improvements from the prior art are as follows:

1. This is the first time that an organized method has been used to link specialties, job functions, skill sets, and experience/training profiles.

2. The concept of skill templates is an innovation that allows for systematic evaluation of employee skills.

3. Previous skills assessment systems only used skill indices. This is the first time that a weighting system has been used to establish the relative significance of various skills. The disadvantage of not using a weighting system is that the skills that may be less important for a job also get equal importance which would be an inaccurate assessment.

4. The system allows for skills to be sub-classified as per technology.

5. Various new skills assessment metrics have been introduced.

6. Assessment of employee suitability for a project is based on quantitative evaluation and not on a subjective consideration.

7. The system allows for evaluation of resource utilization, staffing efficiency, forecast assessment, geographical suitability etc. and many other metrics.

8. A systematic career guidance system has been developed which makes it easy for managers to set career goals and monitor performance of employees.

The ISDRM offers the following unique benefits:

1. Relates skill development of employees to job functions, roles and responsibilities, and project forecasts etc.

2. Adopts a sophisticated method of skills assessment that includes weighting of skills as per their importance for a job assignment.

3. Advanced metrics are used for assessing employee suitability for job assignments.

4. Various metrics are introduced for resource utilization, staffing efficiency, employee job satisfaction etc.

5. Allows design flexibility to allow for new features and metrics.

6. Introduces a new concept in career management by using skill templates and skills assessment indices.

BRIEF DESCRIPTION OF THE DRAWING

FIG. 3 shows a sample default Skills Template, for a CDMA RF ONP Engineer FIG. 4 shows a Skills Template as might be provided by a project manager for provision of resources.

FIG. 5 shows a Skills Assessment form for example Engineer 1.

FIG. 6 shows a Skills Assessment form for example Engineer 2.

FIG. 7 shows a Skills Assessment form for example Engineer 3.

FIG. 8 shows a Suitability Assessment form for example Engineer 1.

FIG. 9 shows a Suitability Assessment form for example Engineer 2.

FIG. 10 shows a Suitability Assessment form for example Engineer 3.

FIG. 11 shows a table of system output, including Suitability Indices and scheduling information.

FIG. 12 shows a sample graph of numbers of engineers vs. skill ratings from the system of the invention.

DESCRIPTION OF THE PREFERRED EMBODIMENT

Figure 1:
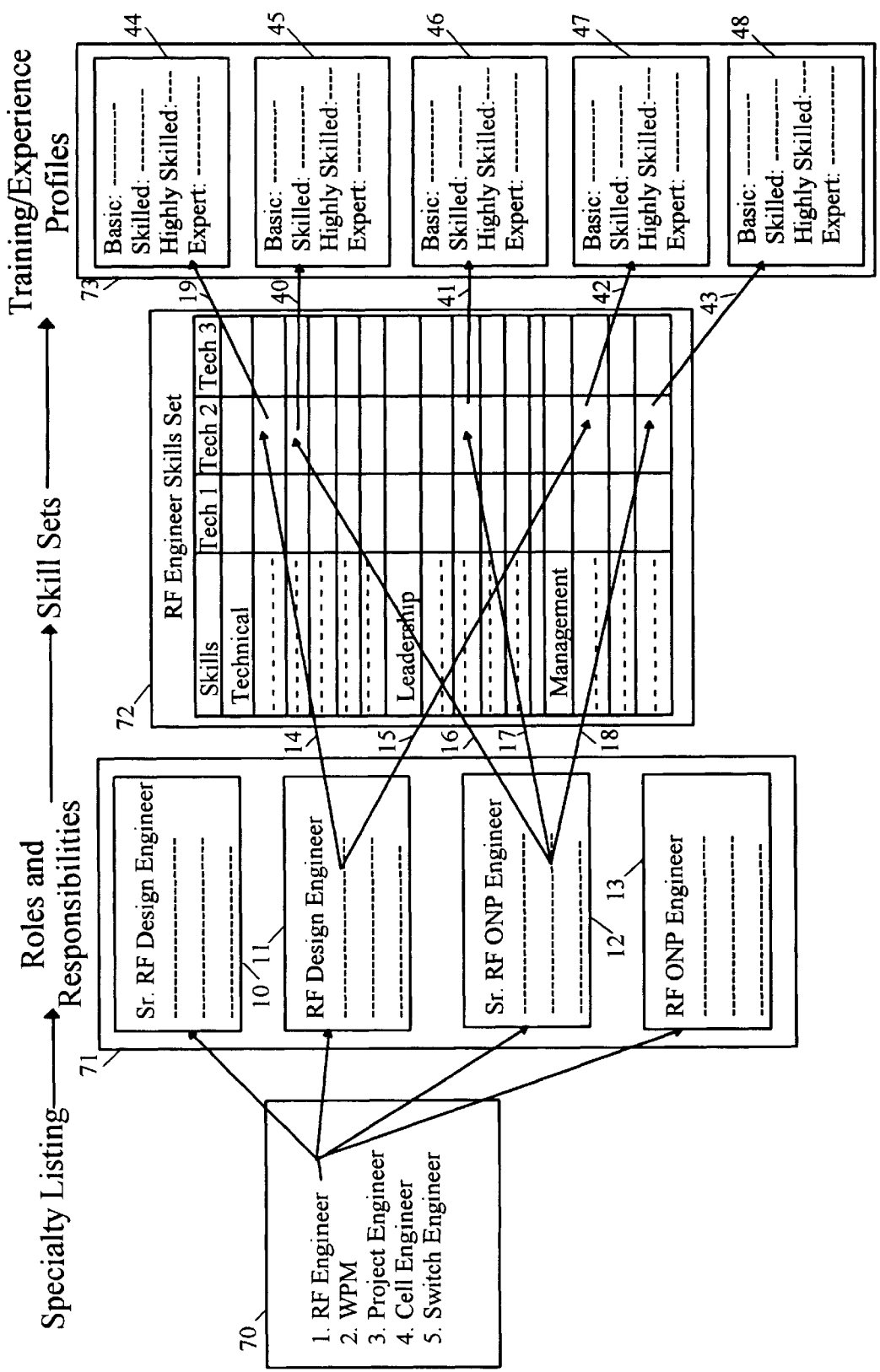
FIG. 1 shows the interrelationship of the various profiles used in the invention.

The method of the invention is called the Intelligent System for Dynamic Resource Management (hereinafter, simply "ISDRM"). ISDRM comprises the following components, which will be discussed in greater detail below.

1. Profiles
2. Skills Assessment
3. Default Skill Templates
4. Employee suitability assessment for a job assignment
5. Deployment on projects
6. Career Development
7. Performance metrics It will be understood that while the method of the invention will be discussed in terms of the jobs and specialties which would be found in a large high-technology company such as Lucent Technologies, that the invention is equally applicable to human resource management in companies in widely differing fields, and the specific jobs, skills, roles, etc., discussed below are provided for example, only, and not to limit the scope of the invention.

For the purposes of this disclosure, the term "specialty" means a general type of employee, whereas "job" means a particular sort of employee having the specialty. For instance, "lawyer" is a specialty, whereas "patent attorney" is a job within the specialty "lawyer". The term "technology", as used herein, may mean a particular form of technology which a person in a job might work on (i. e. fiber optics, microwave waveguide design, etc. ), a system (for example, Time Division Multiple Access (TDMA), Global System for Mobile Communications (GSM), or Code Division Multiple Access (CDMA) cellular telephone systems in the examples used below), or a product line (the Definity® switching system, or the Microsoft® Office suite of programs).

1. Profiles

In the ISDRM model (see FIGS. 1 and 2) all employees (51) are considered part of a large pool of resources. The employees are categorized (70) as per their area of specialty e.g. , RF Engineers, Project Managers, Design Engineers, Software Engineers etc. Each specialty has specific roles that it can assume for the accomplishment of a project. These roles and responsibilities (71) must be clearly defined.

There is also a certain skill set (72) associated with each specialty that basically defines that specialty. To perform each of the roles/responsibilities, a certain combination of skills would be required out of the comprehensive skill list for a specialty.

Thus, each specific role/responsibility (71) for a specialty (for example, a skill for an RF Design Engineer (11)) must point (14)(15) to one or more skills (90)(93) in the skill set (72). Once a list of skills has been established for a particular job assignment (roles and responsibilities), the next step is to define the knowledge and experience that is required by an individual to achieve various levels of proficiency (basic, skilled, highly skilled, expert) in those skills. Thus, the following profiles are preferably maintained in the ISDRM:

(70) List of specialties (71) Roles and responsibilities (72) Skill set for each specialty (73) Knowledge and experience profile for each skill The inter-relationship of these profiles is shown in FIG. 1. Note that for each role/responsibility (71) assigned to a specialty (70), there are at least one or more skills in the skill set (72) for that specialty.

2. Skills Assessment Forms

A sophisticated, carefully designed skills assessment system is the key element of the ISDRM. The system is based on a skills assessment form. Separate skills assessment forms are developed for each specialty. Sample forms are shown in FIGS. 5 through 7 for Specialty 1 (for the purposes of this example, an CDMA RF ONP Engineer, as will be used in the detailed example below), for three representative employees.

The ISDRM skills assessment form has the following features:

(20) Skill Set:

This includes a complete listing of all the skills required for a specialty.

(21)(22)(23) Technology/Product Line: Each skill in a specialty can have specific application depending on technology or product line. ISDRM allows each skill to be categorized as per technology, application, or product line. Under each of these classifications for a skill there are three columns labeled W(Weight)(24), I(Index)(25), and P(Points)(26).

(24) Weight (W):

The skills assessment form not only lists all the skills required for a specialty but also assigns weights to each skill in a specialty. The weights indicate the relevant importance of each skill in performing all the job functions associated with a specialty in that technology. Any finite weight including 0 can be assigned to a skill, "0" meaning the skill is not required for a particular job function while a non-zero number associates a relative importance level to the skill. The weights are decided based upon the roles and responsibilities. Skills can be sub-classified based on application/technology. For example, RF Design Skill 1 (Skill 1 in FIGS. 3–4) is a skill. However, these techniques may be of more use in one technology (say, CDMA (23)) than another (perhaps TDMA (21)), even though both technologies might have use of an RF Design Engineer. Thus, the weight assigned such a skill would be higher for column (23) than column (21). The weight columns may be shaded in the form indicating that these columns are part of the system design and cannot be altered by individual employees. The weights are totaled for each column (30)(31)(32).

(25) Index (I):

The skills of an employee are judged numerically. Although any numeric score could be chosen, as desired (for example, a 0–100 scale), it has been found preferable to use five different levels:

| Skill Level | Index (I) |
|---|---|
| No Knowledge | 0 |
| Basic | 1 |
| Skilled | 2 |
| Highly Skilled | 3 |
| Expert | 4 |

Each of the above levels is assigned a skill index. The skill indices achieved by an employee are entered in the I (Index) columns (25) of the skills assessment form. In the case of the default template shown in FIG. 3, the ideal employee's scores would be entered. For skills not relevant to the job, an entry of "0" would be made, as shown in FIG. 3.

On an employee's Skill Assessment Form, as in the weights, there may be different index numbers for each technology, as the employee's skills might vary from technology to technology. For example, if knowledge of word processing was a skill, a given employee might have a higher index for preparing patent applications than worldwide web pages, even though both skills involve the use of word processing programs.

(26) Points (P):

Points for each skill are calculated as follows:

$$\text{Points} = \text{Index} \times \text{Weight}$$

The points are totaled (33)(34)(35) for each column.

(36)(37)(38) SIA:

The Skills Index Average (SIA) is a metric that compares an employee's skill level against a hypothetical individual who can perform all job Functions related to a specialty at the expert level (in the preferred method, "expert" level is 4.00). The following formula is used to calculate the SIA of an employee for a particular technology (for example, in FIG. 7, CDMA Technology):

$$SIA_{CDMA} = \frac{\text{Sum of Employee Points for all CDMA skills}}{\text{Sum of the Weights for CDMA skills}} = \frac{72}{47} = 1.53$$

The SIA is a weighted average of all the skill indices for an employee and compares the overall skill level of an employee against an ideal. The SIA, therefore, is an absolute measure of the career development of an employee in a particular specialty. In the example of FIG. 7, employee 3 has an SIA for Technology 3 (CDMA) of 1.51, which is slightly higher than the desired overall skill level. In Technology 1 (TDMA) and Technology 2 (GSM), his SIA is only 0.62, which is lower than the desired level for the Technology.

In the actual implementation of the ISDRM, skills assessment forms will be stored in a database. In order to report his/her skills an employee will pull out the skills assessment form for the relevant specialty and fill in only the "Index" boxes, which may be highlighted with a thick border. If an employee has cross-specialty skills, more than one form (one for each specialty) may be maintained for that employee.

3. Default Skill Template

ISDRM allows specific job functions (roles and responsibilities) in a specialty to be identified by a skills template (74). A skills template basically identifies the relevant importance of each skill (Weights) and the skill level (Index) required in each skill to perform a job function. The skill templates are used by managers to deploy employees with suitable skills for various assignments. The templates are also used by employees to plan their career development. A template basically identifies what skill levels are required and what is their importance for a job function. This enables employees to assess what skills they need to perform a job function.

Figure 2:
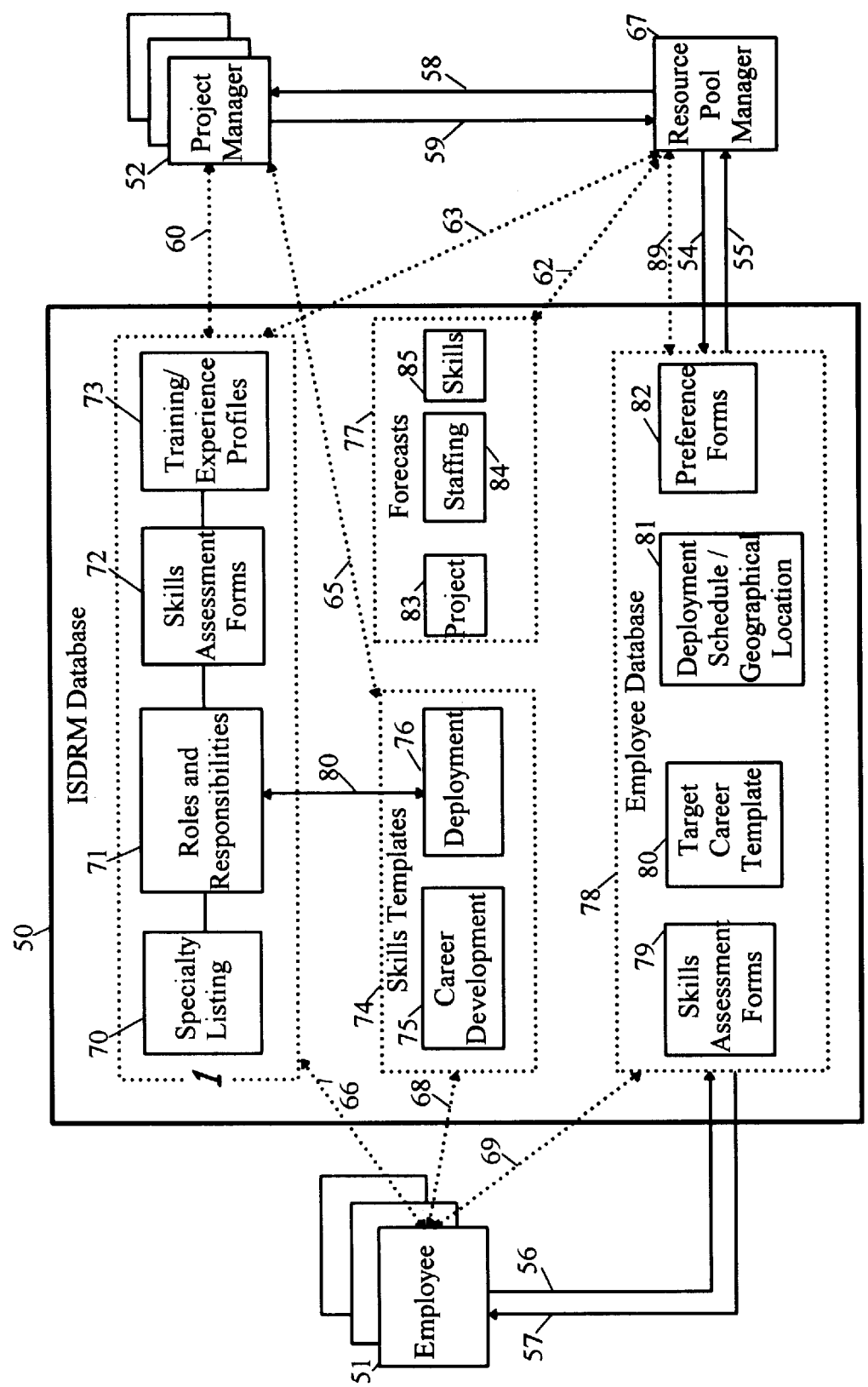
FIG. 2 shows a functional block diagram of the preferred embodiment of the invention

The skills templates (74) shown in FIG. 2 are basically templates that indicate the skills required to perform a particular job function. The template also indicates the relative importance of each skill for a particular job function. These templates can be used to deploy employees on specific assignments. In that case the skills of an employee will be matched against a specific skills template. The templates can also be used as guidelines for employees to plan their career development. Say an employee is currently an RF Engineer and wants to become an RF Lead Engineer in the future. He/she could look at the skills template of RF Lead Engineer and plan his/her training and technical/management experience accordingly.

The reason for having two individual boxes in the skills template box is to make the distinction that the templates (74) will be used by the management (76) to deploy/select the most suitable employees and also used by employees (75) to plan their careers. The boxes for "Career Development Templates" (76) and "Deployment Template"(75) could, if desired, be combined into a "Skills Templates" box or "Job Function Templates" box.

Both the managers and the employees have access to these skills templates because these form the basis for career progression and deployment on tasks.

The way these templates will be used for employee deployment is as follows.

Say a manager needs a person to perform a particular job function. He/she looks up the available Skills Templates in the database and picks up the one that closely matches the job function at hand. If the manager thinks that some changes are required in the template to make it suitable for his/her requirement, then those changes are made and the modified template is used as the "Job Function Template" or "Skills Template"(the terms are synonymous) for his requirement.

4. Employee Suitability Assessment for a Job Assignment

Before staffing a project, an assessment is made of all the employees in the pool of resources for their suitability in performing various roles in the project. The project would be staffed by the most appropriate employees. Two metrics are used to assess the suitability of an employee for a given job function:

a. Suitability Skill Index Average (SSIA) gives a measure of the suitability of an employee for an assignment. To assess the suitability of an employee, for a particular job assignment, his/her skills, from the skills assessment forms in the employee database (79) are assessed against the given skills template (76) for a job function.

A suitability assessment form (see FIG. 7) is generated for the employee in which the skill weights (106) are duplicated from the skills template (see FIG. 6) and the skill indices (99), for the employee, are copied from the Employee Database. If the employee skill index (99), for a particular skill, is higher than the index (98) specified in the skills template then the index in the template is used. This is done to disregard skill indices that are higher than those required for a job function.

The Skills Template or Job Function Template specifies the skills of an employee who is perfectly suited for a particular job function. Apart from specifying the perfect skill indices (Range 0 to 4), the template also specifies the relative importance of each skill (weights that can range from 0 to 4 or any other upper limit) in performing that job function.

When calculating the SSIA of an employee against a Job Function Template then those skills of an employee that are not required for this job are disregarded. For example a Circuit Design Engineer needs to have an index of 1 in Management Skills. If, however, an engineer being assessed for this job has an index of 2 in Management skills it will still be counted as 1, because any higher level in this skill is of no significance to this job function. This truncation is done to avoid deployment of an over-qualified person for a job.

Points (101) for each skill are calculated as a product of the index (100) and weight (106) for each skill, as shown for the individual Skills Assessment form example in FIG. 4. The employee can now be assessed for suitability for the given job function, described by the template, by calculating a Suitability SIA (SSIA). The SSIA (96) of an employee is calculated in the following manner:

$$SSIA = \frac{4 \times \text{Sum of Employee Skill Points from Suitability Assessment Form}}{\text{Sum of Skill Points from Template}}$$

The above formula assumes that maximum value of the SSIA is 4.00, which indicates that the employee possess all the skills required for a given job function defined by the template. Of course, if another scale (say, 0–100) is chosen, then the multiplier in the numerator of the fraction would be the maximum under that scale.

b. Relative Skill Index Average (RSIA): The SSIA gives a measure of the suitability of an employee for a particular job assignment. The SSIA does not, however, take into account employee skill levels that may be higher than those required for the given job function. Thus, if an employee is overqualified for a particular job, i.e., if he/she has higher skill levels than are required for the job, it will not become evident by calculating the SSIA alone. Over qualification can be measured by calculating an RSIA (Relative Skill Index Average) for the employee. Calculation of the RSIA (97) is done in the same way as for the SSIA. The only difference is that in the suitability assessment form the indices are the actual numbers (102) from the Skills Assessment Forms (79) from employee database, and are not limited to the maximum values specified in the skills template (74). The formula used for the RSIA (97) is similar to that used for the SSIA, which is:

$$RSIA = \frac{4 \times \text{Sum of Employee Skill Points from Assessment Form}}{\text{Sum of Skill Points from Template}}$$

The RSIA can have a value greater than 4.00. An RSIA greater than 4.00 indicates that the employee has higher level skills than are required for the job. These skills, however, may or may not fulfill the minimum requirement of the template, which means that even if the RSIA is greater than 4.00, the SSIA may or may not be a perfect 4.00.

5. Deployment on Project

When a project manager (52) has a staffing requirement for a particular project, he/she refers to the default skill templates (76) and picks the template that best suits the task. If the default template does not exactly capture the skills required for the specific task in the project, the project manager can modify the template to suit his/her requirements. The modified template is sent (59) to the related Resource Pool Manager (RPM) (67) as part of a request for resources. Upon receipt of the request, the RPM assesses the suitability of all employees in the Employee Database (78), by comparing their skills against the requested template using their SSIAs and RSIAs. Subject to employee availability, the employee with the highest SSIA and the RSIA closest to 4.00 is deployed on the project.

6. Career Development

The ISDRM is an excellent system for employee career development. By clearly identifying all the skills required by a specialty the system informs the employees of their deficient skills and provides guidance to them as to how to achieve those skills. Default skill templates can be used by employees to measure their suitability for various career assignments and assess their marketability (SSIA) for various job functions. Employees may be required to pick a Target Career Template (80) for themselves after consultation with their managers or career coaches. The manager electronically approves, for adoption, a target template for each employee and sets an achievement target in terms of desired SIA/SSIA levels at the end of a certain time period.

At any instant, the employee can calculate his/her SIA and the SSIA against the Target Career Template to assess how much he/she has achieved. This system provides very clear guidelines to managers for specifying career goals for employees based on company requirements and makes it very simple for them to set achievement targets for employees.

In order to plan his/her career an employee will pick up a skills template from the database. If this template does not exactly match the career requirements of an employee, he/she can change the skill indices and/or weights in the template and adopt it as a Target Career Template. After the Target Career Template is approved by the manager it becomes a guideline for the employee to follow in planning his/her assignments and training. The manager also makes sure that the employee is given assignments that will give him/her the required experience to attain the skills in the target career template.

7. Performance Metrics ISDRM provides for various types of metrics to assess the effectiveness of functional excellence in an organization. These metrics can be broadly categorized as follows, although it will be understood that other custom designed metrics can be added to the system.

a. Metrics for Resource Utilization

Depending upon the work load of a company or organization there will be times when the employees in the pool are not deployed on projects. Furthermore, there could be projects that are staffed by overqualified employees. Both these factors are detrimental to effective resource utilization. ISDRM provides a measure of resource utilization through the following metrics:

i. $RUI_{Employee}$

The Resource Utilization Index (Employee) is a measure of the percentage utilization of an employee's time. For a given period of time, indicated by a start and end date, the $RUI_{Employee}$ can be calculated as follows:

$$RUI_{Employee} = \frac{\text{Effective Days spent on projects, training, and vacation} \times 100}{\text{Total Working Days in the given period}}$$

The ISDRM allows for calculating Effective Days on projects by incorporating some penalties and credits that may be situation specific.

ii. $RUI_{pool}$:

The Resource Utilization Index$_{pool}$ is a measure of the resource utilization of a pool or sub-pool of resources. It is calculated as follows:

$$RUI_{pool} = \frac{\text{Sum of } RUI_{Employee} \text{ for each employee in the pool of resources}}{\text{Total number of employees in the pool of resources}}$$

For the purposes of this explanation, a "Pool" is simply a predetermined group of employees, e.g., pool of RF design engineers in the North-East Region.

The time recording functions are part of the employee database. Basically the database keeps a track of the assignments, training, and vacation time of each employee. Thus when a deployment is to be planned only employees that are available at a particular time are considered.

b. Metrics for Staffing Levels/Performance

A company needs to maintain an optimum level of appropriately trained employees. If the staffing levels are low, contract employees may need to be hired. Staffing projects with under qualified employees is also a problem. In order to assess how successfully a pool of resources was staffed and trained, the following metrics are used:

i. PRS

The Percentage of Requests Serviced is the percentage of all project staffing requests, over a given period of time, that were serviced by utilizing In-house resources, without hiring any contractors.

ii. SEI

The Staffing Efficiency Index is the weighted average of the SSIAs of all employees that were deployed on projects in a given period of time. It is calculated as follows:

$$SEI = \frac{w_1 s_1 + w_2 s_2 + \ldots + w_n s_n}{w_1 + w_2 + \ldots + w_n}$$

where $w_i$ is the number of working days for which an employee is deployed, $s_I$ is the SSIA of the employee who is deployed, and n is the total number of deployments during the given period. . The SSIA is calculated at the time of deployment of the employee.

c. Metrics for Geographical Suitability and Employee Satisfaction i. Geographical Suitability Index (GSI):

Company projects could be at the same location or at different locations. It would be more appropriate and cost effective to staff a project by employees closest to the project location. For suitability assessment of employees for projects, the system calculates a GSI (Geographical Suitability Index). This is done by using an approximate distance calculation using the latitude/longitude of the employee present location and the location of the project.

It should be noted that GSI could be defined in many ways. One of the ways that we are currently using in our system is to record the Latitude ($Lat_{hb}$) and Longitude ($Long_{hb}$) of the employee's current place of work (Home Base). The Latitude ($Lat_d$) and Longitude ($Long_d$) of the place where the employee is to be deployed on a project are then used to calculate an approximate distance between the two locations. The distance could act as the GSI. Preference would be to deploy employees close to their current place of work for least mobility. The GSI or Distance (D), in miles, is then given by the Great Circle Formula, which is:

D=acos[sin($Lat_d$)*sin($Lat_{hb}$)+cos($Lat_d$)*cos($Lat_{hb}$)*cos(|$Long_d$−$Long_{hb}$|)], where Lat_xx and Long_xx are expressed in radians.

Another way of calculating GSI could be to have a GSI of 1 for distances less than say 200. For a distance of 201 to 400 GSI could be 2 and so on. Yet another, more sophisticated, way is to link the database to a travel agency's database then the GSI could be based upon the actual travel expense of an employee from the current location to the location of deployment.

Deployment schedule of the employee has the time based information on his/her schedule in terms of assignments, training, vacation, etc. Geographical location is the current location and/or permanent office location of an employee. For example if an employee has a base office in Whippany, N.J., and is currently deployed in Chicago, Ill., both the locations can be stored in the database.

ii. Preference Match Index (PMI):

The employees may have preferences for various jobs that they want to be assigned to. Every employee could fill out a preference form (82). While assessing suitability of employees for a job assignment, the system calculates a PMI which indicates an employee's degree of satisfaction for that particular job assignment.

A Preference Form is nothing but a questionnaire asking the employee his/her preference in types of assignments, for example, A. What type of project would you like to do:

| Network Design | Network Optimization |
|---|---|
| Network Performance and Maintenance | No Preference |

B. What geographical location you prefer:

| North East | Midwest | South-West |
|---|---|---|
| Asia | South America | No Preference |

C. What duration of assignments do you prefer:
2–8 Weeks 2–6 Months 6 Months- 1 year No Preference
D. . . . and so on.

The PMI could then be computed by a simple formula, such as:

$$PMI = \frac{\text{No. of Preferences Matched} \times 100}{\text{Total No. of Preferences in the Form}}$$

d. Metrics for Gap Assessment:

A manager for a pool of resources (employees) can estimate how well the organization is doing in developing specific skills amongst its employees. There are various statistical analysis that the system offers. Say, for example, the organization wants all employees in the pool of RF Circuit Design Engineers to have an index of 2 in Skill #1, then the system will plot out a Distribution Function for the indices in Skill #1 for all employees in that pool, as shown in FIG. 12.

The system can also calculate the mean (1.83, in the example) and standard deviation of this distribution. The database will also flag mean indices that are below the organization's requirements. These statistics will preferably be accessible only to the management.

II. ISDRM Database and Interactive Program

The functional block diagram of the ISDRM database is shown in FIG. 5. Block (50) in the center with thick borders is the actual database. The small boxes around the database indicate employees (51) and managers (52) within the organization that can access the database (50). The double arrow dotted lines (60)–(66) indicate what parts of the database (50) can be accessed by each. The continuous arrow lines (54)–(59) indicate inputs and outputs of various requests/queries to the database. The salient features of the database are as follows:

(70) List of Specialties:

A complete list of specialties is maintained. Each specialty must link to one or more roles that can be taken by that specialty.

(71) Roles and Responsibilities:

This includes the roles and responsibilities of various job functions. Each job function must belong to at least one specialty in the specialty list. Responsibilities must not be duplicated across various roles. Each role/responsibility must link (80) to one or more skills in the skill list (74) for the related specialty.

(72) Skills Assessment Forms:

For each specialty, a skills assessment form is maintained which lists all the skills required, weighted by their importance, for the job functions of that specialty. For each skill, the database provides a link to the knowledge/experience required to achieve various levels in that skill.

(73) Training/Experience Profiles:

Training/experience profiles are developed for each skill in the skills set.

(74) Skill Templates:

Two types of default templates may be maintained:

(75) Deployment Templates

(76) Career Development Templates

Note:

The above mentioned sections (70)–(76) of the ISDRM database are accessible (66)(68) to all of the employees (51) and also accessible (60)(63)(64) to all managers (52).

(77) Forecasts:

Various types of forecasting data will be maintained including:

(83) Project Forecasts

(84) Staffing Forecasts

(85) Skills Forecasts

These forecasts assist in planning hiring, training, and deployment of human resources. Project Forecasts would simply be a listing of projects that are expected in the future. Based on these project forecasts, staffing forecasts would be generated indicating how many employees of each specialty would be needed in the future. If any new skills are required by the employees for these new projects, they would be included in the database well in advance so that the employees can be trained to acquire those skills. This part of the database is only accessible (62) to the related managers (67).

(78) Employee Database:

Contains the following information for each employee (51):

(79) Filled and approved skills assessment forms

(80) Target Career Template—a template of skill indices that an employee sets as a target of achievement for him/herself after consulting with his/her manager (52).

(81) Deployment schedule and geographical location

(82) Preference sheets indicating the employee's preferences for various assignments.

Every employee (51) can access (56) his/her own data only. RPMs (67) can access the data for all employees in their group. The employee deployment schedule is updated whenever a new deployment is planned for the employee.

III. ISDRM Database Interfaces and Queries

Various interfaces and queries are possible in the ISDRM database which are described in the following.

a. Employee Interface

Employees are able to perform a number of functions, preferably including the following:

(66) Access the skills assessment forms (72), fill them out, and store them for approval by their manager (52).

(66) Access the roles and responsibilities (71) of various job functions and also access (68) their related default templates (76).

(66) Access the training and experience profiles (73) for each skill,

(69) Access their personal deployment schedules (81).

(69) Access their Career Target Template (80) and alter it (56) for approval by their manager (52).

(69) Access their preferences sheet (82) and submit it for review and approval by their manager (52).

(57) Calculate their SSIA in a specialty and technology (system, product, etc. ).

(57) Calculate their SSIA for a job function by selecting a default skills template (74) or by providing any other template.

b. RPM Interface

Apart from all the interfaces available to the employees (51), the Resource Pool Managers (RPMs) (67) are preferably able to do the following:

(89) Approve employee skills assessment (79), Career Target Templates (80), and preference sheets (82).

(55) For a given skills template, list all employees in order of their SSIAs.

The list would include the RSIAs, SlAs, and deployment schedules for each employee or any other parameters that may be added later.

(62) Access the deployment forecasts (77) and requests (59).

(58) Assign resources against deployment requests (59) and forecasts (77).

(55) Given a time period be able to calculate the $RUI_{Employee}$, $RUI_{pool}$, PRS, and SEI for a pool of resources.

c. Project/Program Manager Interface

Apart from all the interfaces available to employees (51), the project manager (52) is preferably able to:

(65) Access default deployment templates (76) and develop custom templates, if needed, for specific jobs.

(59) Submit electronic requests to the RPMs for resources by attaching with them specific job templates.

IV. Example of the use of the ISDRM a. Deployment Request From Project Manager (PM)

Consider a PM that needs a CDMA RF Optimization Engineer, in the month of January 1998, to work on the optimization of upcoming clusters in the Kansas City network of a customer. To perform this job function, an individual is required who has the necessary CDMA Optimization Skills and who may or may not have other RF Engineering Skills. The PM looks at the Deployment Template for a CDMA RF Optimization and Network Performance (ONP) Engineer (as given in FIG. 3) and makes a few changes in it to make it more focused for the RF Optimization job function. For example, he/she may reduce the skill indices and/or weights for skills related to Network Performance Engineering, because these skills are not required for the specific customer task. The job function template developed by the PM is shown in FIG. 4, where the changes compared to the default template are hatched. The PM then sends this job function template to the RPM with a request for deployment of resources.

b. Processing of Request by RPM

The related RPMs responsible for handling the PM's request feed the modified template into the ISDRM database to search for a match of skills. The ISDRM Query Software outputs the names of all the employees in order of their SSIAs, along with their RSIAs, SIAs, and deployment schedules. In order to demonstrate the process by which the ISDRM Software calculates the SSIA and the RSIA consider three RF Engineers in the RF Engineer Pool database. The skills assessment forms for these engineers, as stored in the employee database, are shown in FIGS. 5, 6, and 7. When the job function template is fed into the system, the software generates suitability assessment forms for each of these engineers to calculate their SSIA and RSIA.

The suitability assessment forms for the three engineers are shown in FIGS. 8, 9, and 10, respectively. The weights column has the same numbers as given in the job function template provided by the PM (FIG. 4). The skill indices for the RSIA are the same as from the employee skills assessment forms (FIGS. 5, 6, and 7), however, for the SSIA the skill indices are truncated with the maximum score being the index given in the job function template. The truncated values of the indices are shown in bold figures. The SSIA and the RSIA are now calculated using the following formula:

$$SSIA, RSIA = \frac{4 \times \text{Sum of Employee Skill Points from Assessment Form}}{\text{Sum of Skill Points from Template}}$$

$$= \frac{4 \times \text{Sum of Employee Skill Points from Assessment Form}}{47}$$

The number 47 comes from the skill points total in FIG. 4.

The software calculates the SSIAs and the RSIAs for all the engineers in the database and gives an output similar to the table in FIG. 11.

The actual format of the software output may be more self explanatory and may contain links to more information such as specific dates of deployment, customer name, nature/priority of deployment task, etc. The output may also include metrics such as the GSI (Geographical Suitability Index) and the PMI (Preference Match Index).

c. Scheduling of Deployment

It can be seen from the table of FIG. 11 that Engineer 2 has the highest SSIA (Suitability Skill Index Average) and an RSIA very close to 4.00. This engineer, therefore, is the most suitable for the job. Unfortunately, Engineer 2 is already scheduled for another job assignment during the month of January. Engineer 1 is available in January and has a fairly good SSIA. His/her geographical location (Indian Hill Court) is also suitable for deployment in Kansas City. If there are no other considerations, Engineer 1 is most likely to be deployed in the market. If Engineer 1 is indeed deployed, it will be an under-utilization of his/her skills as indicated by his/her RSIA which is greater than 4.00.

A careful look at the SSIA, SIA, and skill indices of the three engineers gives a very nice comparison of the three engineers. Some of the observations are:

1. Engineer 3 is overall the most skilled CDMA RF Engineer (highest SIA), however, his/her SSIA is the lowest for the given RF Optimization Job assignment. Engineer 2, on the other hand, has the lowest SIA but a very reasonable SSIA.
2. Engineer 1 mostly has RF Design skills and is more suited for an RF network design assignment.
3. Engineer 2 has better Optimization Skills but will have a lower value of SSIA for a Network Design job.
4. Engineer 3 has better management and general skills but lacks in specialty skills, specifically those related to RF network design. However, he/she has achieved a skilled level (2) in optimization skills.
5. As overall CDMA RF Engineers, Engineer 1 and Engineer 3 are midway between Basic and Skilled, whereas, Engineer 2 is a little above Basic level.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method for managing resources in a company having a plurality of specialties and jobs within the specialties, each job having a plurality of associated technologies and skills, and having a plurality of employees, each employee having a plurality of skills in a plurality of technologies, the method comprising the steps of:
   a) establishing a database of specialties, comprising a plurality of specialty records, each specialty record corresponding to a job within a specialty and having a plurality of skills entries for the skills associated with at least one technology associated with the job, each skill entry having at least a weight and an index value;
   b) for each specialty record, assigning a numerical value to the weight in each skill entry for at least one of the associated technologies, the weight being assigned to reflect the relative importance of the skill to the performance of the specialty;
   c) establishing a database of skills templates, comprising a plurality of skills templates, each skills template corresponding to a job within a specialty and having a plurality of skills entries for the skills associated with at least one technology associated with the job, each skill entry having at least a weight and an index value;
   d) for each skills template, assigning a numerical value to the weight in each skill entry for at least one of the associated technologies, the weight being assigned to reflect the relative importance of the skill to the performance of the job;
   e) for each skills template, assigning a numerical value to the index in each skill entry for at least one of the associated technologies, the index value being assigned to reflect the desired value which an ideal employee would have for that skill in that technology;
   f) establishing a database of employees, comprising at least a plurality of skills assessment records, each skills assessment record being associated with an employee and a job, and each skills assessment record having a plurality of skills entries for the skills associated with at least one technology associated with the job, each skill entry having at least a weight, an index value, and a point score;
   g) for a plurality of the employees and at least one job, completing the employee skills assessment by the steps of:
      i) copying the weight value for each skill and technology from the specialty record for the specialty to the corresponding weight value in the employee record;
      ii) assigning a numerical value to the index for each skill for at least one technology, the numerical value reflecting the relative skill of the employee;
      iii) computing a point value for each skill by multiplying the weight value by the index value;
      iv) computing a skills index average by dividing the total of the point values by the total of the weight values;
   h) evaluating the suitability of a plurality of employees for a assignment to a job in a technology by computing and comparing numeric suitability values from the skills assessment records for the employees and the skills templates for the job.

2. The method of claim 1 in which the evaluation of step (h) comprises the steps of:
   i) creating a suitability assessment record for each employee to be evaluated, comprising a plurality of skills entries corresponding to the skills entries in the skills template for the job and technology, each skill entry comprising at least a weight and an index value;
   ii) copying a numeric value for weight for each skills entry in the suitability assessment record from the skill entry in the skills template,
   iii) entering into the index value of the suitability assessment record the smaller of the index value from the employee skills assessment record and the index value from the skills template;

iv) computing a point value for each skill entry in the suitability assessment record by multiplying the weight by the index value;

v) computing a suitability skills index average by dividing the total of the point values by the total of the weight values, the suitability skills index average giving a measure of the suitability of the employee for the job.

3. The method of claim 2, in which the evaluation of step (h) further comprises the steps of:

vi) computing a second point value for each skill entry in the suitability assessment record by multiplying the weight from the suitability assessment record by the index value from the employee's skills assessment record;

vii) computing a relative skills index average by dividing the total of the second point values by the total of the weight values, the relative skills index average giving a measure of the over qualification of the employee for the job.

4. The method of claim 1, further comprising a step, before step (h), of evaluating the numeric values in the skills template and revising the numeric values in view of a specific job assignment.

5. The method of claim 1, in which the assignment of index values of step (g)(ii) is done by the employee.

6. The method of claim 1, further comprising, for a plurality of employees evaluated in step (h), the step of combining the numeric suitability values with at least one additional factor pertaining to the employees.

7. The method of claim 6, in which the additional factor is the availability of the employee in specified time periods.

8. The method of claim 6, in which the additional factor is the desires of the employee.

9. The method of claim 6, in which the additional factor is the geographic location of the employee.

10. The method of claim 6, in which the additional factor is the skills index average.

11. The method of claim 1, in which the database of skills templates is established by the steps of:

i) establishing a list of jobs;

ii) for at least one of the jobs, determining the roles and responsibilities of the job;

iii) for at least one of the roles and responsibilities, determining the skills sets for the job, for at least one technology;

iv) for at least one skill set for a job and a technology, defining the training and experience profile required for the skill.

12. The method of claim 1, in which the database of employees further comprises a target career templates for at least one employee.

13. The method of claim 1, in which the database of employees further comprises a deployment schedule for at least one employee.

14. The method of claim 1, in which the database of employees further comprises a geographical location for at least one employee.

* * * * *